United States Patent
Wimmer

(10) Patent No.: US 8,363,659 B2
(45) Date of Patent: Jan. 29, 2013

(54) CONFIGURATION OF A PROCESS CONTROL SYSTEM

(75) Inventor: Wolfgang Wimmer, Rietheim (CH)

(73) Assignee: ABB Technology AG, Zurich (CH)

( * ) Notice: Subject to any disclaimer, the term of this patent is extended or adjusted under 35 U.S.C. 154(b) by 337 days.

(21) Appl. No.: 12/543,251

(22) Filed: Aug. 18, 2009

(65) Prior Publication Data

US 2010/0040068 A1 Feb. 18, 2010

(30) Foreign Application Priority Data

Aug. 18, 2008 (EP) .................................. 08105067

(51) Int. Cl.
*H04L 12/28* (2006.01)
(52) U.S. Cl. .................................... 370/395.53; 702/60
(58) Field of Classification Search ............. 370/395.53; 702/60
See application file for complete search history.

(56) References Cited

U.S. PATENT DOCUMENTS

| | | | |
|---|---|---|---|
| 6,356,962 B1 * | 3/2002 | Kasper ............................. | 710/29 |
| 7,411,904 B2 | 8/2008 | Foote et al. | |
| 7,945,401 B2 * | 5/2011 | Bowdry et al. ................. | 702/60 |
| 2003/0152075 A1 | 8/2003 | Hawthorne, III et al. | |
| 2004/0017816 A1 | 1/2004 | Ishwar et al. | |
| 2004/0078469 A1 | 4/2004 | Ishwar et al. | |
| 2006/0265515 A1 * | 11/2006 | Shiga et al. .................... | 709/238 |
| 2007/0110077 A1 * | 5/2007 | Takashige et al. ....... | 370/395.53 |
| 2007/0211730 A1 * | 9/2007 | Cuthbert et al. ......... | 370/395.53 |
| 2008/0127210 A1 | 5/2008 | Bosold et al. | |

FOREIGN PATENT DOCUMENTS

WO WO 2008/011618 A2 1/2008

OTHER PUBLICATIONS

European Search Report for EP 08105067.6 dated Dec. 30, 2008.
European Search Report for EP 08105066.8 dated Dec. 30, 2008.
Victor Manuel Flores et al., "Case Study: Design and Implementation of IEC 61850 From Multiple Vendors at CFE La Venta II", Protective Relay Engineers, 2007 60th Annual Conference for IEEE, PI, Mar. 1, 2007, pp. 307-320.
Eric A. Udren, "IEEE (ANSI) Device No. 16—Ethernet Switches and Routers", Protective Relay Engineers, 2008 61st Annual Conference for IEEE, Piscataway, NJ, USA, Apr. 1, 2009, pp. 247-272.
Tatjana Kostic et al., "Understanding and Using the IEC 61850: a case for meta-modelling", Computer Standards and Interfaces, Elsevier Sequoia, Lausanne, CH, vol. 27, No. 6, Jun. 1, 2005, pp. 679-695.
Mladen Kezunovi et al., "Automated Monitoring and Control Using New Data Integration Paradigm", Proceedings of the 38th Hawaii International Conference on System Sciences—2005, Jan. 3, 2005, pp. 1-10.
R.E. Mackiewicz, "Overview of IEC 61850 and Benefits", May 21-24, 2006, pp. 1-8, Piscataway, New Jersey, USA.

(Continued)

*Primary Examiner* — Dang Ton
*Assistant Examiner* — Wei Zhao
(74) *Attorney, Agent, or Firm* — Buchanan Ingersoll & Rooney, P.C.

(57) ABSTRACT

Exemplary embodiments of the present disclosure automatically generate Virtual Local Area Network (VLAN) configuration data from a logical data flow between intelligent electronic devices (IEDs) of a process control (PC) system in accordance with a standardized configuration representation of the system. The process IEDs, switches of an Ethernet switch-based communication network to which the IEDs are connected, and connecting cables are made aware of the assigned VLANs. Any performance analysis or diagnosis on these components can show design problems with VLANs and communication architecture already at engineering or communication system design time.

15 Claims, 2 Drawing Sheets

OTHER PUBLICATIONS

U.S. Patent Application filed on Aug. 18, 2009 entitled "Analyzing Communication Configuration in a Process Control System" naming William Wimmer as inventor; available in U.S. Patent and Trademark Office's IFW system.

Kasztenny, Bogdan et al; IEC 61850: A Practical Application Primer for Protection Engineers; Presented at the 60th Annual Georgia Tech Protective Relaying Conference, Atlanta, Georgia, May 3-5, 2006, 62 pps.

* cited by examiner

```xml
<ConnectedAP iedName="P2KA1" apName="S1">
  <Address>
   <P type="IP">10.41.24.75</P>
   .............
  </Address>
  <GSE ldInst="C1" cbName="Interlock">
   <Address>
    <P type="MAC-Address">01-0C-CD-01-00-01</P>
    <P type="APPID">3001</P>
    <P type="VLAN-PRIORITY">4</P>
    <P type="VLAN-ID">004</P>
   </Address>
   <MinTime unit="s">4</MinTime>
   <MaxTime unit="s">10000</MaxTime>
  </GSE>
  <PhysConn type="Connection">
   <P type="Cable">C1</P>
   <P type="Port">P1</P>
  </PhysConn>
</ConnectedAP>

<ConnectedAP iedName="SW1" apName="S1">
  <Address>
   <P type="IP">10.41.24.105</P>
   .............
  </Address>
  <PhysConn type="Connection">
   <P type="Cable">C1</P>
   <P type="Port">P5</P>
  </PhysConn>
</ConnectedAP>
```

Fig. 3

CONFIGURATION OF A PROCESS CONTROL SYSTEM

RELATED APPLICATION

This application claims priority under 35 U.S.C. §119 to European Patent Application No. 08105067.6 filed in Europe on Aug. 18, 2008, the entire content of which is hereby incorporated by reference in its entirety.

FIELD

The present disclosure relates to process control systems, such as substation automation systems, for example.

BACKGROUND INFORMATION

Substations in high and medium-voltage power networks include primary devices such as electrical cables, lines, bus bars, switches, power transformers and instrument transformers, which can be arranged in switch yards and/or bays. These primary devices are operated in an automated way via a substation automation (SA) system. The SA system includes secondary devices, so-called intelligent electronic devices (IED), which are responsible for protection, control and monitoring of the primary devices. The IEDs may be assigned to hierarchical levels, i.e. the station level, the bay level, and the process level, where the latter is separated from the bay level by a so-called process interface. The station level of the SA system includes an operator work station (OWS) with a human-machine interface (HMI) and a gateway to a network control center (NCC). IEDs on the bay level, which can also be termed bay units, are in turn connected to each other as well as to the IEDs on the station level via an inter-bay or station bus primarily serving the purpose of exchanging commands and status information.

IEDs on the process-level can include electronic sensors for voltage (VT), current (CT) and gas density measurements, contact probes for sensing switch and transformer tap changer positions, and/or intelligent actuators (I/O) for controlling switchgear like circuit breakers or disconnectors. Exemplary process-level IEDs such as non-conventional current or voltage transformers can include an analog-to-digital (AD) converter for sampling of analog signals. Process-level IEDs can be connected to the bay units via a process bus, which can be considered as the process interface replacing a hard-wired process interface. The latter connects current or voltage transformers in the switchyard to the bay level equipment via dedicated copper (Cu) wires, in which case the analog signals of the instrument transformers can be sampled by the bay units.

A communication standard for communication between the secondary devices of a substation has been introduced by the International Electrotechnical Committee (IEC) as part of the standard IEC 61850 entitled "communication networks and systems in substations." For non-time critical messages, IEC 61850-8-1 specifies the manufacturing message specification (MMS, ISO/IEC 9506) protocol based on a reduced open systems interconnection (OSI) protocol stack with the transmission control protocol (TCP) and Internet rotocol (IP) in the transport and network layer, respectively, and Ethernet and/or RS-232C as physical media. For time-critical event-based messages, IEC 61850-8-1 specifies the generic object oriented substation events (GOOSE) directly on the Ethernet link layer of the communication stack. For very fast periodically changing signals at the process level such as measured analog voltages or currents IEC 61850-9-2 specifies the sampled value (SV) service, which, similar to GOOSE, builds directly on the Ethernet link layer. Hence, the standard defines a format to publish, as multicast messages on an industrial Ethernet, event-based messages and digitized measurement data from current or voltage sensors on the process level. SV and GOOSE messages are transmitted over a process bus, which may, for example, result in cost-effective medium or low voltage substations, extend to neighbouring bays, (i.e. beyond the bay to which the sensor is assigned). In the latter case, the process bus transmits, in addition to the process data, command and/or status related messages otherwise exchanged via a dedicated station bus. In the following, the distinction between process and station bus in SA systems is eliminated.

In communication systems technology, within Local Area Networks (LAN) constructed by connecting a plurality of computers or other intelligent devices together, a concept called "virtual LAN" (VLAN) employs functionality for arbitrarily and logically grouping terminals or nodes which are connected to switches of the network. Ethernet VLANs according to IEEE 802.1Q allow restricting access to the terminals connected to an Ethernet network within a VLAN as well as restricting the data flow of multicast Ethernet messages to predefined parts of the Ethernet network where receiver terminals are connected which belong to the same VLAN. Hence a VLAN is able to reduce unnecessary network traffic and ensure security.

In Ethernet switch-based networks, VLAN definitions are handled within the Ethernet switches. Therefore, the latter are configured or otherwise made aware of the relevant VLANs. Specifically, for each port of a switch, the switch knows if a particular incoming VLAN (multicast) message shall be forwarded to this port or not (i.e., if this port also belongs as output port to the VLAN of the incoming message).

In Ethernet switch-based networks, it is assumed that any single connected terminal belongs to one specific VLAN. This terminal can then only talk to other terminals belonging to the same VLAN. When configuring the switches, the ports to these communicating terminals are therefore called access ports, and these access ports are only allowed to belong to one VLAN, while the other ports internal to the communication system, which are called trunk ports, may belong to several VLANs. As soon as the VLAN IDs of the access ports are known, the switches can automatically determine the VLAN IDs to which the trunk ports must belong. A VLAN can then either be manually configured into the switches, or automatically configured by means of a central table relating, for each terminal, the terminal's MAC address to a VLAN ID. However, the latter mechanism is disadvantageous because the central table has to be modified when replacing a failed terminal by a new one with a different MAC address, or because the address server containing this relation fails. Therefore, and especially within process control systems, the VLAN configuration is typically manually configured.

SA systems based on IEC61850 are configured by a standardized configuration representation or formal system description called substation configuration description (SCD). An SCD file includes the logical data flow between the IEDs on a "per message" base, i.e. for every message source, a list of destination or receiver IEDs, the message size in terms of data set definitions, as well as the message sending rates for all periodic traffic like GOOSE, SV and Integrity reports. The SCD file likewise specifies the distribution of multicast messages into Virtual Local Area Networks (VLANs), in which a single IED may send different real time messages for different purposes within different VLANs of the SA communication system. Hence the above concept of access ports can not be applied; however the concept of edge ports, i.e. ports which have not to be considered at RSTP loop avoidance algorithm in physically meshed networks, is still valid (in this notation, an edge port connected to an end node or IED that is assigned to one single VLAN corresponds to an access port). This can complicate the configuration of VLANs on the switches.

Furthermore, the assumption of all IEDs spontaneously sending data within their VLAN is normally not applicable for SA real time applications containing pure message receivers for certain VLANs. In addition, the receivers of messages of a VLAN may not send messages within the same VLAN (they do not send any VLAN messages, or within another VLAN). Both these facts prohibit automatic VLAN detection by the switches based on received messages.

For large SA or process control systems with increased real time critical communication needs due to multicast communication traversing the entire system, the communication network load is of interest. This is e.g. the case for GOOSE and SV messages from IEC 61850. In addition, station level IEDs such as operator work station and gateway, may not be adapted to handle more than 200 to 1000 messages per second. Principles and methods of the present disclosure are not restricted to a use in substation automation, but are likewise applicable to other process control systems with a standardized configuration description. For example, IEC 61850 is also an accepted standard for Hydro power plants, Wind power systems, and Distributed Energy Resources (DER).

SUMMARY

An exemplary embodiment provides a method of configuring a process control (PC) system with a plurality of intelligent electronic devices (IEDs) connected to at least one switch of an Ethernet switch-based communication network. A sender IED can be configured to send different messages to different predetermined receiver IEDs, and a switch of the communication network can be configured to forward periodic multicast messages irrespective of the receiver IEDs. The exemplary method comprises retrieving, for a sender IED among the plurality of IEDs and for each message configured to be transmitted by the sender IED, from a standardized configuration representation of the PC system having logical data flow definitions, receiver IEDs for which the message is destined, and a Virtual Local Area Network Identifier (VLAN ID). In addition, the method comprises assigning, for a receiver IED, a respective VLAN ID of each message destined for the receiver IED to an edge port of a switch of the communication network to which the receiver IED is connected.

An exemplary embodiment provides a configuration tool for a process control (PC) system with a plurality of intelligent electronic devices (IEDs) connected to an Ethernet switch-based communication network. A sender IED is configured to send different messages to different predetermined receiver IEDs. A switch of the communication network is configured to forward periodic multicast messages irrespective of the receiver IEDs. The exemplary configuration tool comprises means for retrieving, for each sender IED among the plurality of IEDs and for each message configured to be transmitted by the sender IED, from a standardized configuration representation of the PC system comprising the logical data flow definitions, receiver IEDs for which the message is destined, and a Virtual Local Area Network Identifier (VLAN ID). In addition, the exemplary configuration tool comprises means for assigning, for a receiver IED, a respective VLAN ID of each message destined for the receiver IED to an edge port of a switch of the communication network to which the receiver IED is connected.

BRIEF DESCRIPTION OF THE DRAWINGS

Additional features, advantages and refinements of the present disclosure are described in more detail below with reference to exemplary embodiments illustrated in the drawings, in which:

FIG. 3 shows an excerpt of an exemplary SCL file.

DETAILED DESCRIPTION

Figure 1:
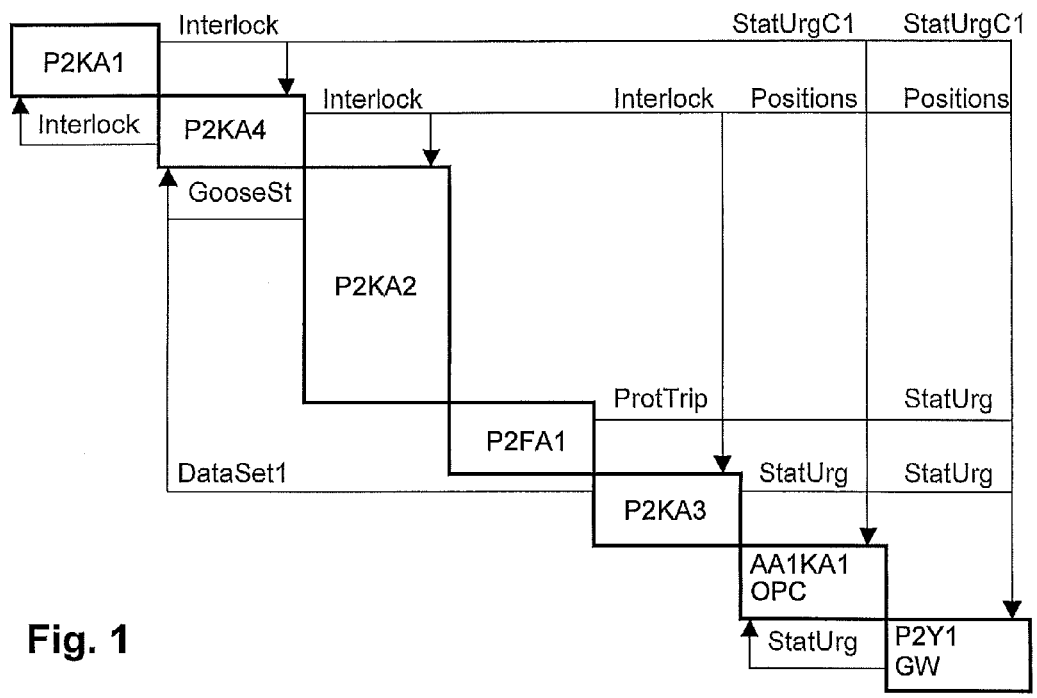
FIG. 1 is an exemplary function chart of logical data between a plurality of IEDs.

Exemplary embodiments as disclosed herein are directed to reducing network traffic and preventing overflow in switched communication networks of process control (PC) or substation automation (SA) systems through selective forwarding of messages to their intended destination. A method of configuring a PC or SA system and a configuration tool are disclosed herein.

According to an exemplary embodiment of the present disclosure, Virtual Local Area Network (VLAN) configuration data can be automatically generated from a logical data flow between intelligent electronic devices (IEDs) of the PC or SA system as described within the standardized configuration representation of the system. The process IEDs, as well as the switches of the Ethernet switch-based communication network to which the IEDs are connected, can be made aware of the assigned VLANs. Any performance analysis or diagnosis on these devices can show design problems with VLANs and communication architecture already at engineering or communication system design time. Exemplary embodiments of the present disclosure provide a process control proof alternative to manual VLAN configuration as well as to automatic VLAN handling in commercial switch based communication networks.

According to an exemplary embodiment, a configuration for the trunk ports can be defined by comparing the data flow from source to destination IEDs with the physical switch network, to thereby determine to which VLAN ID(s) the trunk ports and purely network internal switches shall belong. This configuration is advantageous if pure tree networks are used, such as in systems working with dual network redundancy like IEC 62439 PRP instead of ring redundancy, for example.

According to exemplary embodiment, such as for switch ring communication network structures and other meshed Ethernet topologies using spanning tree algorithms, or connections to commercial Ethernet backbones, the VLAN ID association of trunk ports and network internal switches can be assigned to existing automatic VLAN discovery algorithms in the switches. The VLAN ID assignment at engineering time according to the disclosure can thus be performed, exclusively or in addition to other ports, for edge ports and their (possible) trunk ports.

According to an exemplary embodiment of the disclosure, formal information about individual messages such as size or sending rate can be retrieved from the standardized configuration representation, consolidated or grouped per switch or per connecting cable, and evaluated to determine a network load situation at the latter. The relevant messages can, for example, be the messages transmitted or forwarded by the switch or cable, the corresponding message sources or control blocks in turn comprising the VLAN IDs assigned to the (ports of the) switch under consideration, or to a port of a switch to which the cable is connected, respectively.

For event based reports, the formal information retrieved can include, for example, a general data change rate indicative of a normal state data flow, e.g., 1 message/second for a measurand message source reporting event-based measurement changes of one bay, as well as a burst size indicative of a maximum or worst-case peak load, e.g. 5 messages within 200 ms for the aforementioned measurand message source, plus 5 messages per event source. Accordingly, for every switch and/or connecting cable, the normal and exceptional network load can be calculated in advance based on a prediction of the messages received under various circumstances.

Exemplary embodiments of the present disclosure also provide a computer-readable recording medium (e.g., ROM, hard disk, flash memory, etc.) on which a computer program is recorded (encoded). The program includes executable instructions that cause and control one or more processors of a configuration tool or other device configured to be connected to a communication network of an SA or PC system and configured to store a standardized configuration representation of the SA or PC system.

FIG. 1 is a function chart showing an exemplary configured communication or logical data flow between Intelligent Electronic Devices (IEDs) of an exemplary Substation Automation (SA) system. The data flow can include, for example, unbuffered reports ("e.g. "position" from IED P2KA4 to Gateway P2Y1 and OPC server AA1KA1) and GOOSE messages (e.g. "interlock" from IED P2KA4 to IEDs P2KA3, P2KA1, P2KA2).

Figure 2:
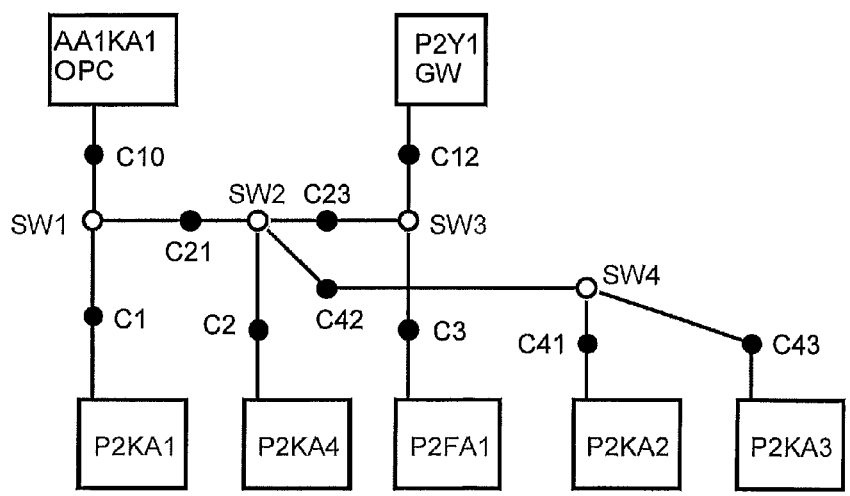
FIG. 2 depicts a function chart showing an exemplary communication network.

FIG. 2 depicts an exemplary physical network structure of the communication network of the SA system illustrated in FIG. 1. In the example of FIG. 2, switches (open circles), cables (dots), and IEDs (rectangles) are illustrated. The switches SW1, SW2, SW3, SW4 can be connected to the IEDs with cables C1, C2, C3, C41, C43, C10, C12, and among themselves with trunk cables C21, C23, C42.

FIG. 3 illustrates an excerpt of a Substation Configuration Language (SCL) file. The example of FIG. 3 is concerned with IED "P2KA1" and switch "SW1" of the SA communication system introduced in FIG. 1. The parts of the SCL file reproduced in FIG. 3 can define for GOOSE "interlock" messages a Virtual Local Area Network (VLAN) identifier ("VLAN-ID" 004) and sending frequency (MinTime, MaxTime) as exemplary formal information. Furthermore, an exemplary description of physical network structure in the standardized configuration representation according to IEC 61850 can include a reference to the cable "C1" interconnecting port "P1" of the IED and port "P5" of the switch, c.f. FIG. 2.

For instance, the VLANs to be configured into the switches and their edge ports connecting to the IEDs can be determined as follows:

(1) The Substation Configuration Description (SCD) description according to IEC 61850 contains a communication section with, in addition to the control blocks for event based reporting, control blocks for real-time based messages (GOOSE and SV) to be sent within a logical sub-network, i.e. a physical Ethernet segment in which every IED can reach any other connected IED without intervening routers. The GOOSE and SV control blocks identify all the senders of VLAN related messages. If they do not already include an assignment to a VLAN, a unique and unambiguous VLAN identifier may be assigned to the control block when required, where such assignment can be based on user-defined message classes. In contrast to multicast GOOSE and SV, the reported events can always be directed to one dedicated receiver IED exclusively.

For example, the SCD description can specify for each control block, i.e. for each message type or corresponding message source/service class, the receiver or intended destination IEDs, thus defining the logical data flow. From this information, by transferring the sender's VLAN ID to all receiver IEDs, the totality of VLAN IDs of all receiver IEDs can defined and can be assigned to the outgoing edge ports at directly connecting switches.

(2) For all concerned IEDs, the connecting switches are searched. This information can likewise be provided by the SCD file communication section by the PhysConn syntax element, for example. Alternatively, information about the structure of the physical communication network, in terms of switches and connecting cables at the switch ports, can be entered manually or read from some data base, or obtained by exploring an existing switch network with network management commands (SNMP). With this information, the basic VLAN configuration for all switches, i.e. the physical connections across the switch network, can be derived.

(3) The aforementioned assignments can be reported as a "switch/port VLAN configuration" in a switch specific configuration file format, to be exploited during configuration of the switches, for example. Alternatively, the VLAN configuration information can be sent with management commands (e.g. on SNMP base) to all switches prepared to accept this type of commands. The properly configured switches implementing the above-derived VLAN configuration information will be able to restrict real-time data traffic to within the VLANs. This assists in preventing the network and unintended receivers from being flooded with unsolicited multicast messages, and ultimately guarantee stability of the SA or PC systems.

(4) In those cases where the switch trunk ports can and shall be configured automatically, step (1) may be sufficient. If, however, the trunk ports shall also be configured, then by using a formal description of the switch network, e.g. as contained within an IEC 61850 SCD file as a separate IP SubNetwork with port connections defined by the PhysConn element, the paths from each sender to all its receivers through the switch network can be found by a topology analysis, and all switches and outgoing switch ports on these paths can be configured to belong to the sender VLAN.

In the example depicted in FIGS. 1 and 2, the GOOSE messages are assigned to VLANs as follows: "DataSet1" and "Interlock" belong to VLAN 004, "ProtTrip" belongs to VLAN 010, and "GooseSt" is assigned to dummy VLAN 000 and always broadcasted everywhere. The resulting VLAN configuration per switch as well as per outgoing port (cable) of each switch is consolidated in the following table. P2WA1.A refers to a redundant subnetwork.

| Switch/-Port (cable) | VLAN ID list | | |
|---|---|---|---|
| P2WA1.A.SW3 | 000 | 010 | |
| -P2WA1.A.C3 | 000 | | |
| -P2WA1.A.C12 | 000 | | |
| -P2WA1.A.C23 | 010 | | |
| P2WA1.A.SW2 | 000 | 010 | 004 |
| -P2WA1.A.C2 | 000 | 004 | |
| -P2WA1.A.C21 | 000 | 004 | |
| -P2WA1.A.C23 | 000 | | |
| -P2WA1.A.C42 | 010 | 004 | |
| P2WA1.A.SW1 | 000 | 004 | |

| Switch/-Port (cable) | VLAN ID list | | |
|---|---|---|---|
| -P2WA1.A.C10 | 000 | | |
| -P2WA1.A.C1 | 000 | 004 | |
| -P2WA1.A.C21 | 004 | | |
| P2WA1.A.SW4 | 000 | 010 | 004 |
| -P2WA1.A.C41 | 000 | 004 | |
| -P2WA1.A.C42 | 000 | 004 | |
| -P2WA1.A.C43 | 010 | 004 | |

The control blocks can include formal information about the sending rate (such as the SV sample rate, GOOSE maxtime & mintime, integrity period of reports, for example) and a reference to a data set, the analysis of which leads to a number of data values and message sizes sent. Accordingly, with all paths through the communication system known, and the sending periods of the real time data as well as the message size from the data set definition referenced by the control block extracted from the SCD file, the communication system normal or background load on all switches and cables can be calculated. The calculated load considers the routing restrictions caused by correct application of the VLANs within the connecting switch network. For example, the results are valid for a communication system with properly configured VLANs. In addition, the known bit rate at the cables between switches and the switch message throughput rate may be used to consider any pipeline effect.

By providing a worst case data change scenario for event based GOOSE messages in the form of a burst size indicative of a maximum or worst-case load (e.g., 5 messages within 200 ms for a measurand message source, plus 5 messages per event source with switch position changes, protection trips or supervision alarms), load peaks can be calculated for each connected switch. A comparison with appropriate switch processing rates can indicate, for example, how long it should take to handle a burst, and/or allow considering back pressure effects at the communication system bottle necks.

The resulting performance and the overlaying of VLANs on the physical network can then be used to judge the validity of the communication system design, and support in rearranging the communication system physical structure in a more optimal way, if needed. This analysis is further supported by emphasizing graphically all those system parts where bottle necks are reached, and by highlighting resulting worst case message delays as well as a needed buffer size to prevent any loss of messages. For example, any load below the maximum (e.g. 100 MB/s for an Ethernet cable, or 200 messages/s for a station level IED) can be considered to be non-critical. However; by summing up non-critical network loads of different paths, the cable to the station level PC or Gateway, or the station level PC itself might exceed its capacity and become a bottle neck.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A method of configuring a process control (PC) system with a plurality of intelligent electronic devices (IEDs) connected to at least one switch of an Ethernet switch-based communication network, where a sender IED is configured to send different messages to different predetermined receiver IEDs, and where a switch of the communication network is configured to forward periodic multicast messages irrespective of the receiver IEDs, the method comprising:

retrieving, for the sender IED among the plurality of IEDs and for each message configured to be transmitted by the sender IED and from a standardized configuration representation of the PC system having logical data flow definitions, a Virtual Local Area Network Identifier (VLAN ID); and assigning, for a receiver IED, a respective VLAN ID of each message destined for the receiver IED to an edge port of a switch of the communication network to which the receiver IED is connected.

2. The method according to claim 1, comprising: assigning, based on information about a physical structure of the communication network obtained from the standardized configuration representation of the PC system, VLAN IDs to a trunk port of a switch of the communication network to which another switch is connected.

3. The method according to claim 1, comprising: deriving, by a switch of the communication network and based on at least one message received during operation of the PC system, a VLAN ID of a trunk port of the switch to which another switch is connected.

4. The method according to claim 2, comprising: evaluating a network load at a switch of the communication network, based on the assigned VLAN IDs and formal information about at least one message transmitted by the switch.

5. The method according to claim 2, comprising: evaluating a network load at a cable connected to a port of a switch of the communication network, based on a VLAN ID of the port and formal information about at least one message transmitted by the cable.

6. The method according to claim 4, comprising: retrieving, from the standardized configuration representation of the PC system, formal information about the at least one message transmitted, the formal information including a data change rate and a burst size for event based reports.

7. A configuration tool for a process control (PC) system with a plurality of intelligent electronic devices (IEDs) connected to an Ethernet switch-based communication network, where a sender IED is configured to send different messages to different predetermined receiver IEDs, and where a switch of the communication network is configured to forward periodic multicast messages irrespective of the receiver IEDs, the configuration tool comprising:

means for retrieving, for each sender IED among the plurality of IEDs and for each message configured to be transmitted by the sender IED and from a standardized configuration representation of the PC system comprising logical data flow definitions, a Virtual Local Area Network Identifier (VLAN ID); and means for assigning, for a receiver IED, a respective VLAN ID of each message destined for the receiver IED to an edge port of a switch of the communication network to which the receiver IED is connected.

8. The tool according to claim 7, comprising: means for assigning, based on information about a physical structure of the communication network obtained from the standardized configuration representation of the PC system, VLAN IDs to a trunk port of a switch of the communication network to which another switch is connected.

9. The tool according to claim 8, comprising: means for evaluating a network load at a switch of the communication network, based on the assigned VLAN IDs and formal information about at least one message transmitted by the switch.

10. The tool according to claim 8, comprising: means for evaluating a network load at a cable connected to a port of a switch of the communication network, based on a VLAN ID of the port and formal information about at least one message transmitted by the cable.

11. The method according to claim 3, comprising: evaluating a network load at a switch of the communication network, based on the derived VLAN IDs and formal information about messages transmitted by the switch.

12. The method according to claim 3, comprising: evaluating a network load at a cable connected to a port of a switch of the communication network, based on a VLAN ID of the port and formal information about at least one message transmitted by the cable.

13. The method according to claim 5, comprising: retrieving, from the standardized configuration representation of the PC system, formal information about the at least one message transmitted, the formal information including a data change rate and a burst size for event based reports.

14. The method according to claim 1, wherein the PC system is a substation automation system.

15. The tool according to claim 7, wherein the PC system is a substation automation system.

* * * * *